United States Patent
Kano (10) Patent No.: US 7,227,460 B2
(45) Date of Patent: Jun. 5, 2007

(54) LIGHTING DEVICE CONTROL APPARATUS FOR VEHICLES

(75) Inventor: Hideki Kano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 185 days.

(21) Appl. No.: 11/029,711

(22) Filed: Jan. 5, 2005

(65) Prior Publication Data
US 2005/0195074 A1    Sep. 8, 2005

(30) Foreign Application Priority Data
Jan. 14, 2004  (JP)  .............................. 2004-006635

(51) Int. Cl.
*B60Q 1/26* (2006.01)
*B60Q 1/02* (2006.01)

(52) U.S. Cl. ...................... 340/469; 340/468; 340/475; 362/507; 315/82; 307/10.1; 359/838

(58) Field of Classification Search ................. 340/469
See application file for complete search history.

(56) References Cited

U.S. PATENT DOCUMENTS

| | | | | |
|---|---|---|---|---|
| 5,499,169 A | * | 3/1996 | Chen | 362/494 |
| 5,851,064 A | * | 12/1998 | Lyons | 362/494 |
| 6,118,371 A | * | 9/2000 | Haddad et al. | 340/458 |
| 6,152,587 A | * | 11/2000 | Berg | 362/494 |

FOREIGN PATENT DOCUMENTS

JP    2003-237460    8/2003

\* cited by examiner

*Primary Examiner*—Donnie L. Crosland
(74) *Attorney, Agent, or Firm*—Carrier, Blackman & Associates, P.C.; Joseph P. Carrier; William D. Blackman (57) ABSTRACT

A lighting device control apparatus used in a vehicle which includes a headlight for illuminating a running direction of the vehicle; a first lighting device provided at a side of an external mirror of the vehicle; a second lighting device provided at a front side of the external mirror; and a direction indicator operating device, operated by a driver of the vehicle, for indicating the running direction of the vehicle, wherein the direction indicator operating device controls at least the on/off state of the first lighting device. The apparatus has a lighting device control device for producing a daytime on-state of the second lighting device, according to an on state of the headlight and an operational position of an ignition switch of the vehicle. The second lighting device, conventionally used as a direction indicator, can be used as a daytime running light for improving the visibility in the daytime.

16 Claims, 8 Drawing Sheets

FIG. 8

LIGHTING DEVICE CONTROL APPARATUS FOR VEHICLES

BACKGROUND OF THE INVENTION

1. Field of the Invention

The present invention relates to a lighting device control apparatus for controlling the on/off state of a lighting device for vehicles.

Priority is claimed on Japanese Patent Application No. 2004-006635, filed Jan. 14, 2004, the content of which is incorporated herein by reference.

2. Description of the Related Art

Conventionally, such a lighting device control apparatus may be used as a direction indicator (or a side turning light) for indicating the running direction of a vehicle (which has the lighting device control apparatus) to the surroundings (refer to Japanese Unexamined Patent Application, First Publication No. 2003-237460). In this case, a main light source and a sub (or auxiliary) light source (as an accessory), which satisfy standardized conditions such as (road) regulations, are provided at an external mirror of the vehicle, and both light sources are synchronously turned on and off.

In conventional vehicles, in order to make the vehicle sufficiently visible (i.e., to improve the visibility of the vehicle) in the daytime, daytime running lights (DRL) may be provided, that is, the headlights for illuminating an area in the running direction of the vehicle may be turned on in the daytime, or a lighting device of exclusive use may be provided at the vehicle, which is turned on while the vehicle is running in the daytime.

However, when the vehicle is running while the headlights, which consume large power, are turned on, power of the battery is excessively consumed. In addition, when a lighting device exclusively for increasing visibility in the daytime is provided, costs for the vehicle are increased.

SUMMARY OF THE INVENTION

In consideration of the above circumstances, an object of the present invention is to provide a lighting device control apparatus for improving the visibility of the vehicle in the daytime and for efficiently using the lighting device.

Therefore, the present invention provides a lighting device control apparatus used in a vehicle which includes a headlight for illuminating a running direction of the vehicle; a first lighting device (e.g., a main light source 16a in an embodiment explained below) provided at a side of an external mirror (e.g., a door mirror 11 in the embodiment) of the vehicle; a second lighting device (e.g., a sub light source 16b in the embodiment) provided at a front side of the external mirror; and a direction indicator operating device (e.g., a direction indicator switch 27 in the embodiment), operated by a driver of the vehicle, for indicating the running direction of the vehicle, wherein the direction indicator operating device controls at least the on/off state of the first lighting device and the lighting device control apparatus comprises:

a lighting device control device (e.g., a control device 21 in the embodiment) for producing a daytime on-state of the second lighting device, according to an on state of the headlight and an operational position of an ignition switch (e.g., an ignition switch 23 in the embodiment) of the vehicle.

According to the lighting device control apparatus for vehicles having the above-explained structure, the lighting device control device produces the daytime on-state of the second lighting device, according to the on state of the headlight and the operational position of the ignition switch of the vehicle, so that the second lighting device can function as a daytime running light (DRL) for increasing the visibility of the vehicle in the daytime. Therefore, the second lighting device, which is conventionally used by the driver of the vehicle as a direction indicator for indicating the running direction of the vehicle to the surroundings can be used as a daytime running light (DRL) for improving the visibility of the vehicle in the daytime. Accordingly, it is possible to realize a lighting device control apparatus for vehicles or a relevant vehicle, by which visibility of the vehicle in the daytime can be improved and the lighting device can be efficiently used.

Preferably, the lighting device control device produces a daytime on-state of at least one of other lighting devices provided with the vehicle besides the first and second lighting devices, wherein the daytime on-state of the second lighting device and the daytime on-state of the at least one of the other lighting devices are simultaneously produced. Therefore, the lighting device control device can produces a daytime on-state of another lighting device provided with the vehicle besides the first and second lighting devices, in synchronism with the daytime on-state of the second lighting device. Accordingly, a plurality of lighting devices can be lit in the daytime on-state, thereby further improving the visibility of the vehicle in the daytime.

As a typical example, the lighting device control device changes illuminance of the second lighting device lit in the daytime on-state, according to the on/off state of the first lighting device. Therefore, when the first lighting device is repeatedly turned on and off as a direction indicator while the second lighting device is in the daytime on-state, an apparent state can be realized in which the second lighting device and the first lighting device are turned on and off in synchronism with each other as a direction indicator. Accordingly, the visibility for the on/off state of the first lighting device is not degraded even when the first lighting device is in the daytime on-state; thus, visibility of the vehicle in the daytime can be improved and the lighting devices can be efficiently used.

In this case, when the second lighting device is in the daytime on-state, the lighting device control device may make the on/off state of the second lighting device in synchronism with the on/off state of the first lighting device. Therefore, when the first lighting device is repeatedly turned on and off as a direction indicator while the second lighting device is in the daytime on-state, the function of the second lighting device as the daytime running light source is temporarily stopped and the second lighting device is turned on and off in synchronism with the on/off state of the first lighting device. Accordingly, it is possible to produce an apparent state in which the first and second lighting devices are the same direction indicator. Accordingly, even when the second lighting device is lit in the daytime on-state, the visibility of the first lighting device is temporarily given priority, thereby most efficiently improving both the visibility of the vehicle in the daytime and the visibility of the direction indicator.

Also in the above case (see the "typical example"), preferably, when the second lighting device is in the daytime on-state, the lighting device control device raises illuminance of the second lighting device from a specific level in synchronism with the on state of the first lighting device and lowers the illuminance of the second lighting device to the specific level in synchronism with the off state of the first lighting device. Therefore, when the first lighting device is repeatedly turned on and off as a direction indicator while the second lighting device is in the daytime on-state, the luminance of the second lighting device is changed in synchronism with the on/off state of the first lighting device while maintaining the function of the second lighting device as the daytime running light source. Accordingly, it is possible to produce an apparent state in which the first and second lighting devices are simultaneously turned on and on as a direction indicator. Therefore, in addition to improving both the visibility of the vehicle in the daytime and the visibility of the direction indicator, it is possible to realize a lighting device control apparatus for vehicles or a relevant vehicle, by which standardized conditions such as legal regulations are satisfied.

The lighting device control device may keep specific illuminance of the second lighting device in the daytime on-state, regardless of the on/off state of the first lighting device. In this case, it is possible to maintain the daytime on-state of the illuminance of the second lighting device regardless of the on/off state of the first lighting device. Therefore, it is unnecessary to consider the relationship between the on/off state of the first lighting device and the on/off state of the second lighting device, thereby simplifying the circuit structure. In addition, illuminance for the daytime on-state is always secured, and thus visibility of the vehicle in the daytime can be further improved.

Typically, illuminance of the daytime on-state of the second lighting device is lower than illuminance of the on state of the first lighting device.

DETAILED DESCRIPTION OF THE INVENTION

Hereinafter, embodiments according to the present invention will be explained with reference to the drawings.

FIRST EMBODIMENT

Structure and Arrangement of Lighting Device.

Figure 1:
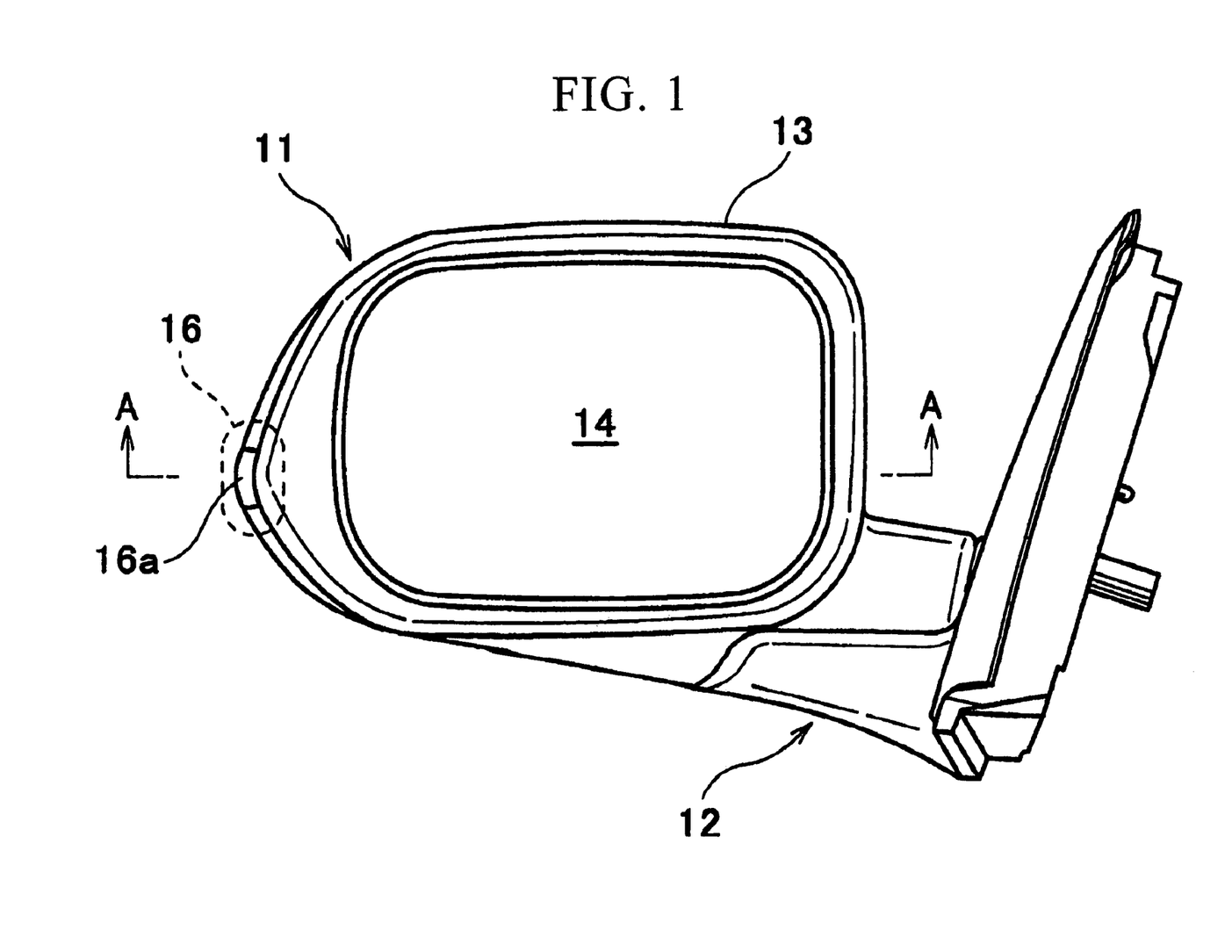
FIG. 1 is a front view showing a door mirror, in which a side turning light is mounted, observed from the back side of the vehicle body, where the on/off state of the side turning light is controlled by the first embodiment of the lighting device control apparatus according to the present invention.
Figure 2:
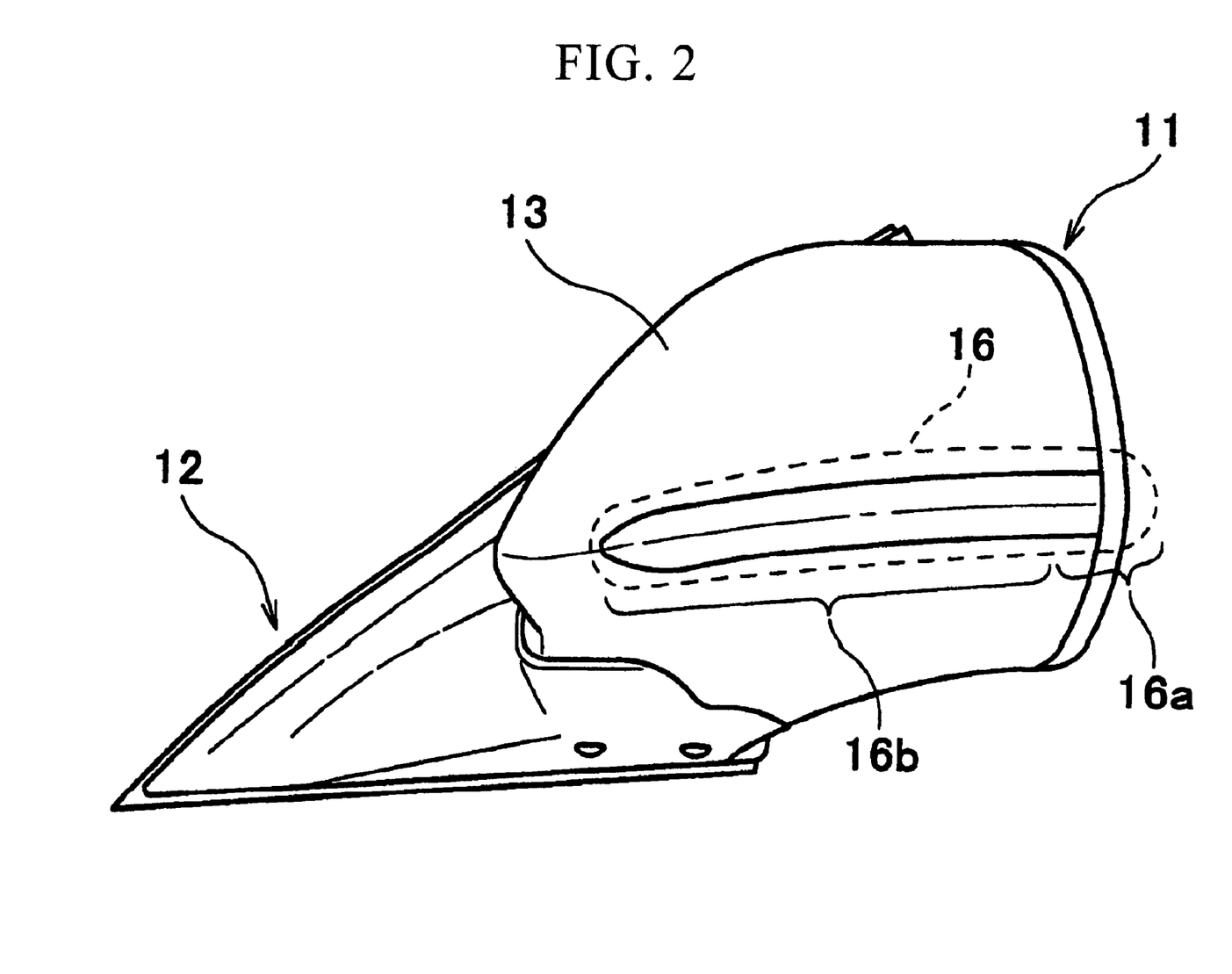
FIG. 2 is a side view of the door mirror having the side turning light whose on/off state of the side turning light is controlled by the lighting device control apparatus in the embodiment.
Figure 3:
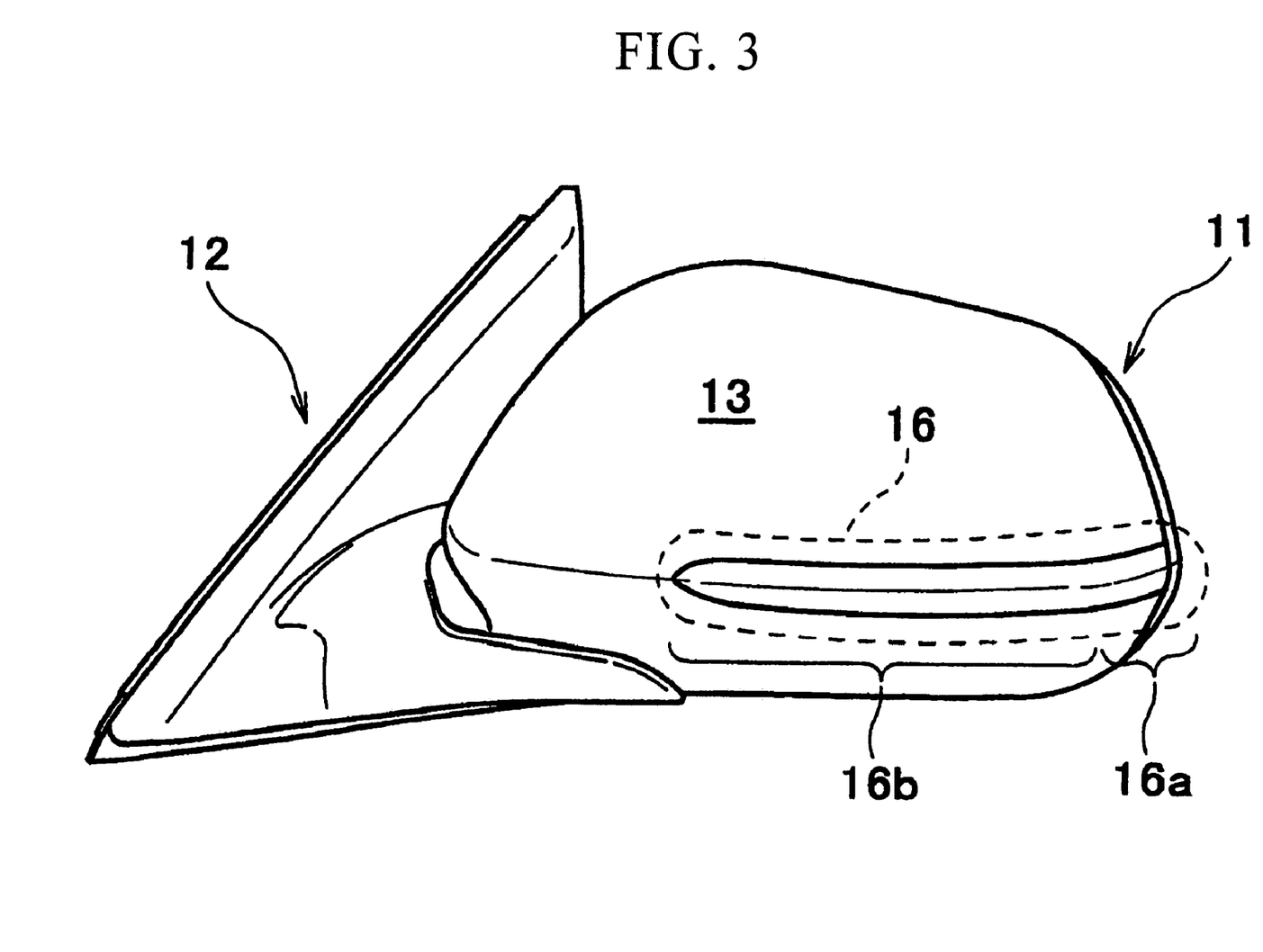
FIG. 3 is a view of the door mirror, observed at an oblique angle from the front side of the vehicle body, where the door mirror has the side turning light whose on/off state of the side turning light is controlled by the lighting device control apparatus in the embodiment.
Figure 4:
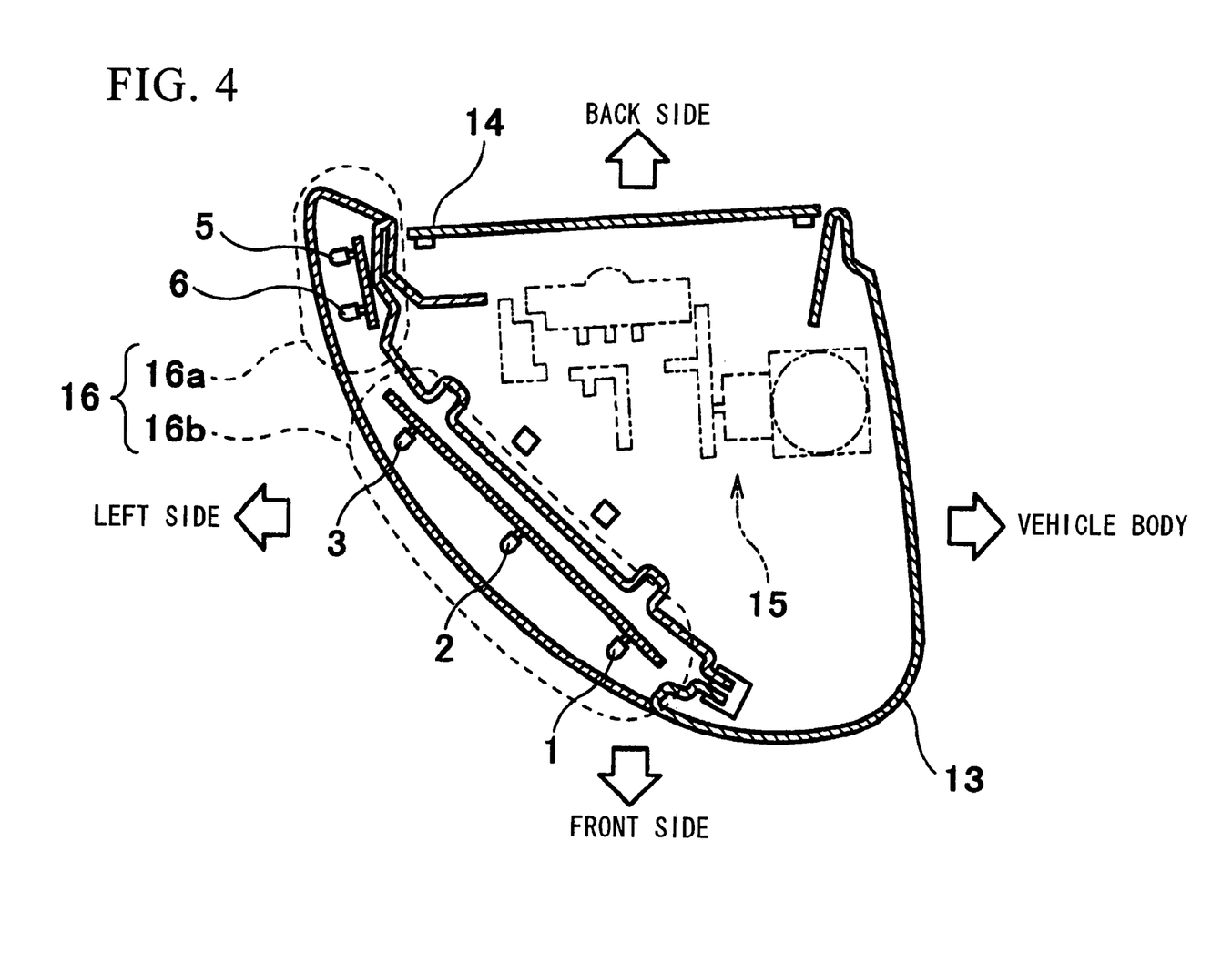
FIG. 4 is a sectional view of the door mirror along line A—A in FIG. 1.

FIG. 1 is a front view showing a door mirror 11 (i.e., an external mirror), in which a side turning light 16 is mounted, observed from the back side of the vehicle body, where the on/off state of the side turning light 16 is controlled by the lighting device control apparatus as the first embodiment of the present invention. FIG. 2 is a side view of the door mirror 11. FIG. 3 is a view of the door mirror 11, observed at an oblique angle from the front side of the vehicle body. FIG. 4 is a sectional view along line A—A in FIG. 1.

The lighting device control apparatus for vehicles of the present embodiment is effectively applied to vehicles such as motorcars. In this embodiment, the apparatus is mounted in a motorcar as an example, and thus the above vehicle body is a body of a motorcar. In addition, to simplify explanations, only one of the door mirrors 11 at the right and left sides is shown (in this embodiment, the door mirror at the left side is shown).

In FIGS. 1 to 4, the door mirror 11 is a member provided close to the front edge of the sash of the front door of the motorcar, and this mirror is used for checking the back side. The door mirror 11 has a base 12 functioning as a connection with the vehicle body, a housing 13, held by the base 12, for supporting a mirror 14, and a driving device 15 (refer to FIG. 4), provided in the mirror 14 and housing 13, for changing the reflection angle of the mirror 14. The housing 13 has no protrusion and rotates toward the back side of the vehicle body when receiving a specific power from the front side.

In the housing 13, a side turning light 16 is provided, whose on/off state is controlled by the lighting device control apparatus of the present embodiment. The side turning light 16 has a main light source 16*a* provided at the pointed end of the housing 13 in the outside of the motorcar, and a sub (or auxiliary) light source 16*b* having a predetermined length along the surface of the housing 13, where no gap is provided between the light sources 16*a* and 16*b* (i.e., both are integrated).

FIG. 4 is a sectional view showing the concrete arrangement of the main light source 16*a* and the sub light source 16*b*. As the main light source 16*a*, high brightness LEDs are used for satisfying legal regulations, more specifically, LEDs 5 and 6 having brightness higher than that of the sub light source 16*b* are arranged along the surface of the housing 13. These LEDs are visible from the back side and from the (left) side of the vehicle. As the sub light source 16*b*, three LEDs are arranged toward the front side of the vehicle along the surface of the housing 13, which are continued with the main light source 16*a*.

When the running direction of the vehicle is changed, the side turning light 16 is repeatedly turned on and off at specific regular intervals so as to indicate the present state (i.e., direction change) to the back side and the left side of the vehicle. That is, the side turning light 16 functions as a direction indicator, and the quantity of light of the direction indicator is legally regulated. More specifically, the main light source 16*a* is provided at the pointed end of the housing 13 in the outside of the vehicle and is visible from the left side and the back side of the vehicle; thus, the main light source 16*a* substantially functions as the direction indicator and is independently required to have a quantity of light which satisfies relevant legal regulations. Conversely, as shown in FIGS. 1 to 4, the sub light source 16*b* is invisible from the back side of the vehicle and is used as an accessory for improving the design of the vehicle; thus, the sub light source 16b may produce a quantity of light smaller than that of the main light source 16a. As the direction indicator, other lighting devices which similarly operate as the main light source 16a are also provided at specific positions at the front and rear sides of the vehicle.

Structure of Apparatus

Figure 5:
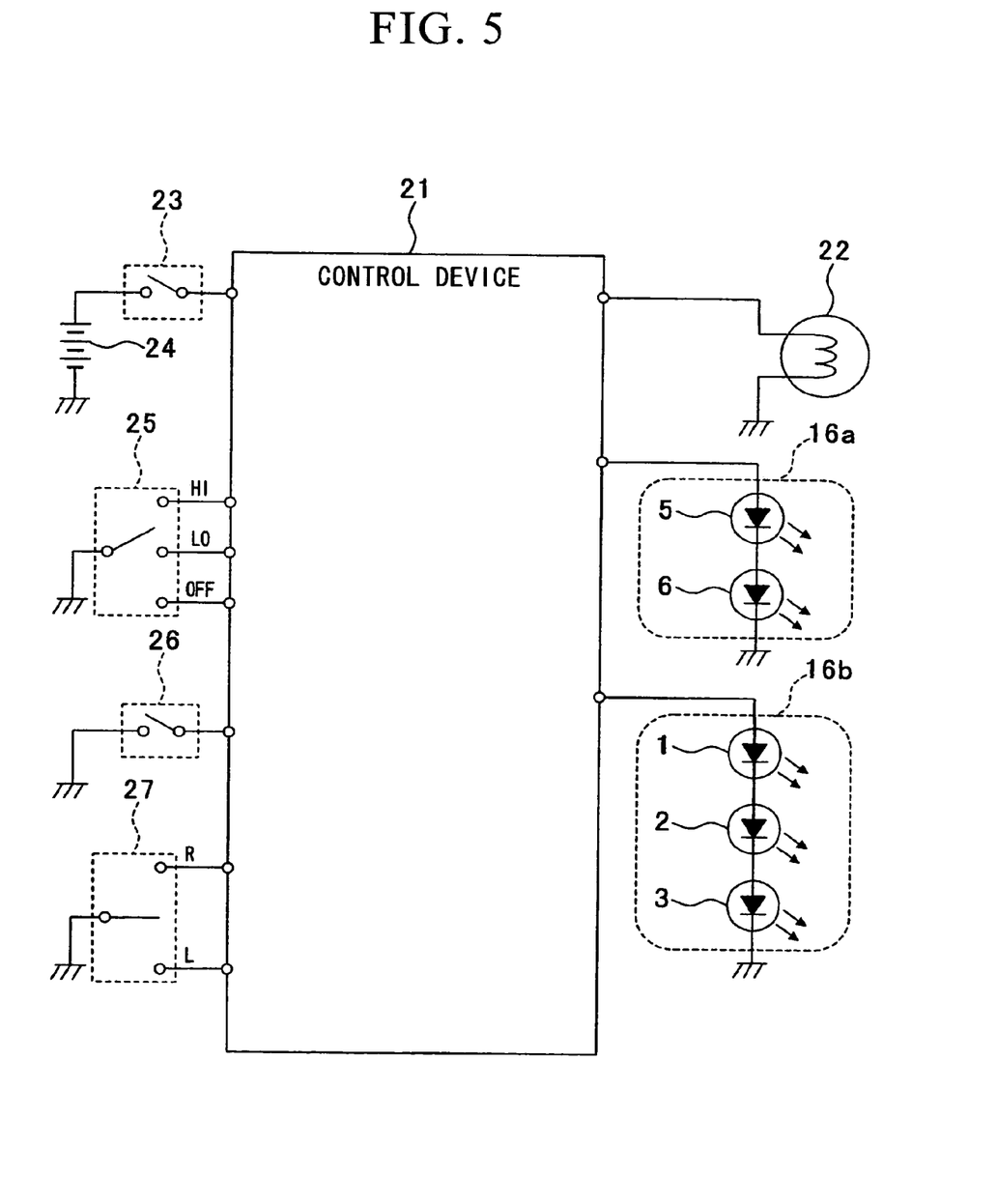
FIG. 5 is a block diagram for showing the structure of the lighting device control apparatus in the embodiment.

Next, the structure of the lighting device control apparatus for vehicles in the present embodiment will be explained by referring to the drawings. FIG. 5 is a block diagram for showing the structure of the lighting device control apparatus in the present embodiment. Also in this block diagram, only one of the side turning lights 16 at the right and left sides (here, at the left side) is shown to simplify explanations. Similarly, only one of the headlights at the right and left sides is shown for simple explanations.

In FIG. 5, the control device 21 is a control section as a principal portion of the lighting device control apparatus of the present embodiment. Based on the signals output from various operation switches provided at suitable positions of the vehicle, the control device 21 controls (i) switching devices such as relay circuits, transistors, or the like, so as to perform the on/off control of the above-explained side turning light 16, (ii) the headlight 22 which is provided at the front side of the vehicle and which can illuminate the surroundings in the running direction of the vehicle, and the like. The control device 21 may have a CPU (central control unit), or a control logic circuit for exclusive use, for performing the on/off control.

More specifically, in the structure of the lighting device control apparatus for vehicles, a battery 24 for the vehicle is connected via an ignition switch 23 to the control device 21. As various operation switches positioned at appropriate positions of the vehicle and connected to the control device 21, there are a headlight switch 25 for operating the headlight 22, a parking switch 26 for indicating the operation state of the parking brake of the vehicle, and a direction indicator switch 27 for operating the direction indicator which is provided for indicating the running direction of the vehicle.

The headlight switch 25 has an OFF position while the light is off, a LO position while the light emits a low power beam toward the neighborhood of the front side of the vehicle, and a HI position while the light emits a high power beam to an area away from the front side of the vehicle. That is, "OFF" of the headlight switch 25 indicates that the switch is operated to have the OFF position while "ON" of the headlight switch 25 indicates that the switch is operated to have one of the LO and HIGH positions.

When the parking brake is operated, the parking switch 26 is set ON and a terminal of the control device 21 is connected to the earth (or ground) terminal. When the parking brake is released, the parking switch 26 is set OFF.

The direction indicator 27 has no specific OFF (i.e., light-off) position but has two ON positions: R position for lighting the direction indicator at the right side, and L position for lighting the direction indicator at the left side. Therefore, "OFF" of the direction indicator 27 indicates that the switch is not operated to have either of the R and L positions, while "ON" of the direction indicator 27 indicates that the switch is operated to have one of the R and L positions.

In addition to the headlight 22 provided at the front side of the vehicle for illuminating the running direction of the vehicle, the main light source 16a and the sub light source 16b, which are parts of the above-explained side turning light 16, are also connected to the control device 21. More specifically, as the main light source 16a, high brightness LEDs 5 and 6 in series connection are connected to the control device 21, where the anode terminal of the high brightness LED 5 is connected to the control device 21 and the cathode terminal of the high brightness LED 6 is connected to the earth terminal. As the sub light source 16b, LEDs 1, 2, and 3 in series connection are connected to the control device 21, where the anode terminal of the LED 1 is connected to the control device 21, and the cathode terminal of the LED 3 is connected to the earth terminal. Therefore, according to signals output from the various operation switches at appropriate positions of the vehicle, the control device 21 controls switching devices such as relay circuits, transistors, and the like, so that electrical power is supplied from the control device 21 to the high brightness LEDs 5 and 6 or the LED 1, 2, and 3 and the LEDs receiving the power are emitted.

On/Off Control of the Lighting Devices by the Control Device 21

Figure 6:
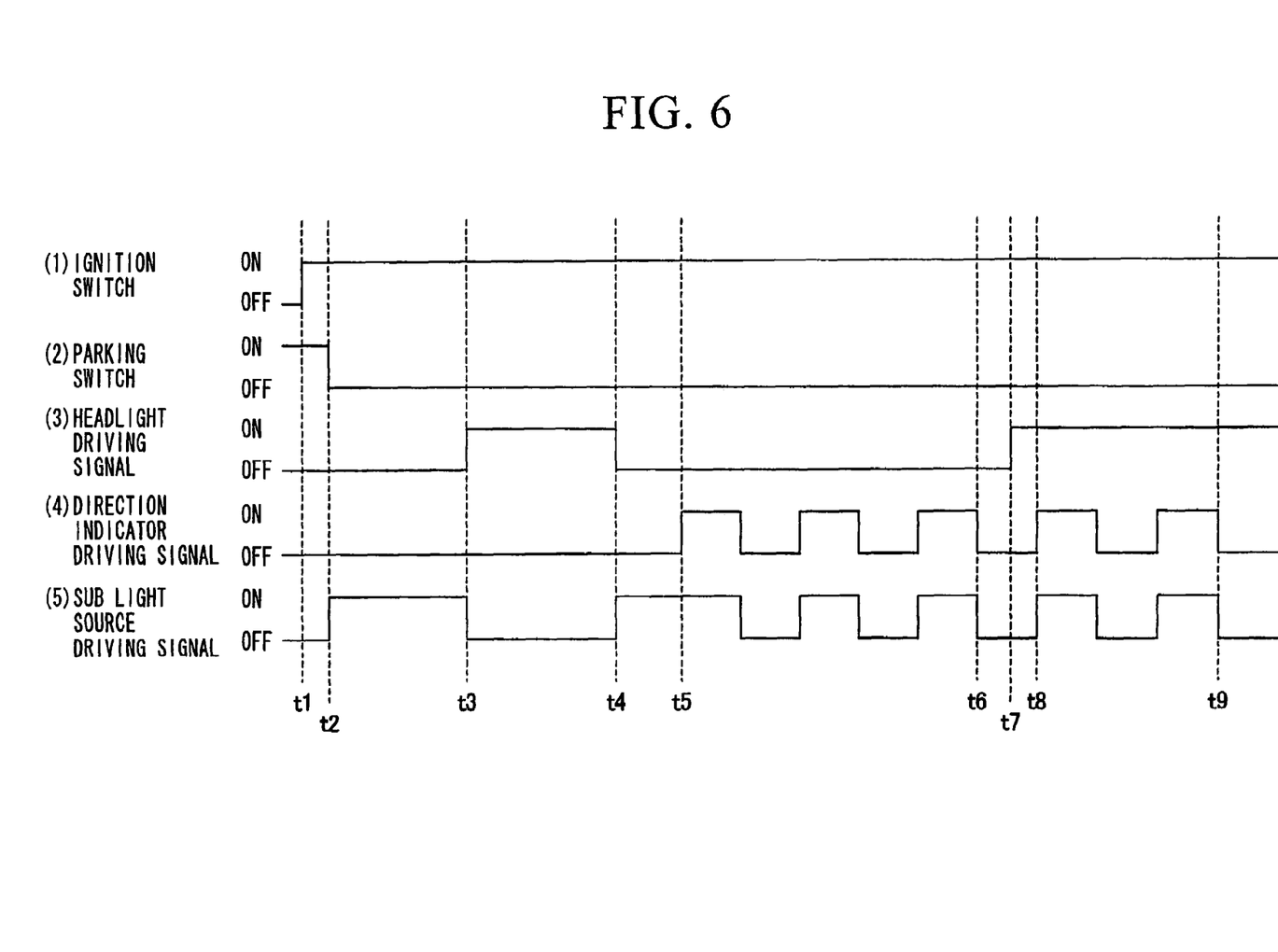
FIG. 6 is a timing chart for signals used in the on/off control for the lighting devices by the lighting device control apparatus in the first embodiment.

Hereinbelow, the on/off control of the lighting device by the control device 21 in the lighting device control apparatus of the present embodiment will be explained with reference to the drawings. FIG. 6 is a timing chart for signals used in the on/off control. In FIG. 6, "OFF" of the ignition switch indicates before the starting of engine, while "ON" of the ignition switch indicates after the starting of engine (see (1) in FIG. 6); and "OFF" of the parking switch indicates that the parking switch is released, while "ON" of the parking switch indicates that the parking switch is operated (see (2) in FIG. 6).

Also in FIG. 6, the headlight driving signal is a driving signal supplied to the headlight 22 for driving the headlight 22, and "OFF" and "ON" of this signal respectively indicate the light-off state and the light-on state of the headlight 22 (see (3) in FIG. 6). Similarly, the direction indicator driving signal is a driving signal supplied to the direction indicator which includes the high brightness LEDs 5 and 6 so as to drive the direction indicator, and "OFF" of the direction indicator driving signal indicates the light-off state of the direction indicator including the high brightness LEDs 5 and 6, while "ON" of the direction indicator driving signal indicates the light-on state of one or both of the high brightness LEDs 5 and 6 (of the direction indicator) provided at the right and left sides (see (4) in FIG. 6). The sub light source driving signal is a driving signal supplied to the LEDs 1, 2, and 3 so as to drive these LEDs, and "OFF" of this signal indicates the light-off state of the sub light source 16b while "ON" of the signal indicates the light-on state of the sub light source 16b (see (5) in FIG. 6).

As shown in FIG. 6, at time t1, the ignition switch 23 is switched from OFF to ON and the engine is started. When the parking brake is released at time t2 and the parking switch 26 is switched from ON to OFF, the on/off control of the sub light source 16b by the control device 21 is started.

At this time (t2), if the headlight switch 25 and the direction indicator switch 27 are both off and the headlight driving signal and the direction indicator driving signal are also OFF, the control device 21 makes the sub light source driving signal (supplied to the LEDs 1, 2, and 3) on and drives the LEDs 1, 2, and 3 at constant voltage, so as to turn on the sub light source 16b as a daytime running light in the daytime. Instead of such constant voltage driving, in the present embodiment, the LEDs may be dynamically driven using a pulse-shaped driving signal so as to make the sub light source 16b emit at lower power.

If the headlight switch 25 is turned on while the sub light source 16b is on, the control device 21 makes the headlight driving signal (supplied to the headlight 22) ON so as to turn on the headlight 22 (see t3 to t4 in FIG. 6) and also makes the sub light source driving signal (supplied to the LEDs 1, 2, and 3) OFF so as to turn off the sub light source 16b.

If the direction indicator switch 27 is turned on while the sub light source 16b is on, the control device 21 outputs a driving signal in which ON and OFF states are alternated at specific regular intervals as the direction indicator driving signal supplied to the direction indicator which includes the high brightness LEDs 5 and 6 (see t5 to t6 in FIG. 6), so as to make the main light source 16a (i.e., the high brightness LEDs 5 and 6) repeatedly turn on and off. At the same time, the control device 21 also outputs a driving signal, in which ON and OFF states are alternated at specific regular intervals and in synchronism with the direction indicator driving signal, as the sub light source driving signal supplied to the LEDs 1, 2, and 3, so as to make the sub light source 16b (i.e., the LEDs 1, 2, and 3) repeatedly turn on and off in synchronism with the main light source 16a (i.e., the high brightness LEDs 5 and 6).

After the headlight switch 25 is turned on at time t7 while the sub light source 16b is off, if the direction indicator switch 27 is turned on (see time t8 to t9), the control device 21 outputs a driving signal in which ON and OFF states are alternated at specific regular intervals as the direction indicator driving signal and outputs a driving signal in which ON and OFF states are alternated at specific regular intervals and in synchronism with the direction indicator driving signal as the sub light source driving signal.

Accordingly, while the headlight 22 is off, the sub light source 16b is used as a daytime running light in the daytime, which improves the visibility of the vehicle from the surroundings. When the direction indicator switch 27 is turned on and thus the direction indicator is operated, the sub light source 16b is switched on and off as the direction indicator in synchronism with the main light source 16a; thus, visibility of the direction indicator from the surroundings can be improved.

In the above embodiment, the emitting devices used as the main light source 16a and the sub light source 16b are not limited to LEDs, and any emitting devices which can be driven (i.e., switched on) by a pulsed driving signal can be used. In addition, the daytime running light (DRL) lit in the daytime for improving the visibility of the vehicle is not limited to the sub light source 16b, and another lighting device provided at the vehicle, other than the main light source 16a, may be lit together with the sub light source 16b.

As explained above, the lighting device control apparatus for vehicles in the present embodiment is applied to a vehicle having the main light source 16a provided at a side of the door mirror 11, the sub light source 16b provided at the front side of the door mirror 11, and the direction indicator switch 27, operated by a driver for indicating the running direction, for controlling the on/off state of the direction indicator including the main light source 16a. In the control apparatus, the control device 21 starts the on/off control of the sub light source 16b when the engine is started and the parking brake is released. In this condition, if both the headlight switch 25 and the direction indicator switch 27 are off, that is, both the headlight 22 and the direction indicator are not lit, the control device 21 makes the sub light source 16b be lit at normal or lower power as a daytime running light in the daytime.

If the headlight switch 25 is turned on while the sub light source 16b is lit at normal or lower power, the control device 21 turns off the sub light source 16b. If the direction indicator switch 27 is turned on while the sub light source 16b is lit at normal or lower power, the control device 21 alternates the on state and the off state of the LEDs 1, 2, and 3, where the sub light source 16b is lit at normal or lower power in the on state and the sub light source 16b is off in the off state, so that the sub light source 16b (i.e., the LEDs 1, 2, and 3) is switched on and off in synchronism with the main light source 16a (i.e., the high brightness LEDs 5 and 6). If the direction indicator switch 27 is turned on while the sub light source 16b is off, the control device 21 makes the sub light source 16b (i.e., the LEDs 1, 2, and 3) switch on and off in synchronism with the main light source 16a (i.e., the high brightness LEDs 5 and 6) according to the above-explained method.

Accordingly, the sub light source 16b, which has been conventionally used as a direction indicator operated by the driver for indicating the running direction of the vehicle, can be used as a daytime running light (DRL) for improving the visibility of the vehicle in the daytime. Therefore, it is possible to realize a lighting device control apparatus for vehicles or a relevant vehicle, by which visibility of the vehicle in the daytime can be improved and the lighting device can be efficiently used. In addition, another lighting device (i.e., other than the main light source 16a and the sub light source 16b) may be lit in the daytime in synchronism with the sub light source 16b, thereby further improving the visibility of the vehicle in the daytime.

Furthermore, when the main light source 16a as the direction indicator is switched on and off while the sub light source 16b is lit in the daytime, an apparent state can be realized in which the sub light source 16b and the main light source 16a are turned on and off in synchronism with each other as a direction indicator. Therefore, even when the sub light source 16b is lit in the daytime, visibility of the main light source 16a in the repeatedly on/off state is not degraded and thus sufficient visibility can be obtained for both of the vehicle and the direction indicator in the daytime. In particular, when the function of the sub light source 16b as a daytime light source is temporarily made ineffective so as to turn the main light source 16a and the sub light source 16b on and off in synchronism, highest visibility can be obtained for both of the vehicle and the direction indicator in the daytime.

SECOND EMBODIMENT

Another Embodiment of On/Off Control of Lighting Devices.

Figure 7:
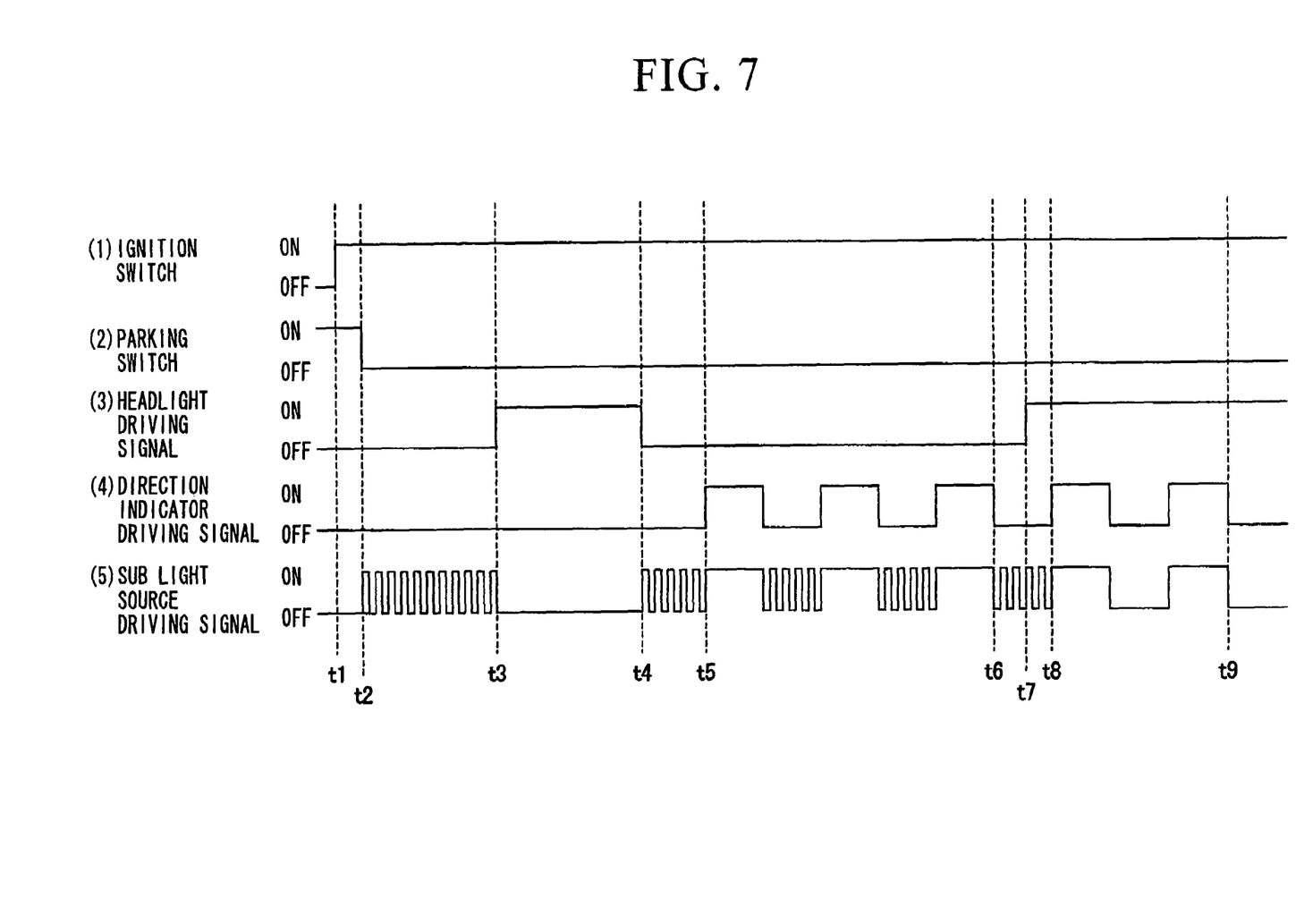
FIG. 7 is a timing chart for signals used in the on/off control for the lighting devices by the lighting device control apparatus as the second embodiment according to the present invention.

Next, another embodiment of the on/off control of the lighting devices will be explained as the second embodiment with reference to the drawings. FIG. 7 is a timing chart of signals for indicating the on/off control of the lighting devices in the present embodiment. In the second embodiment, the structure of the lighting device control apparatus and the structure of each lighting device whose on/off state is to be controlled by the lighting device control apparatus, are identical to those of the lighting device control apparatus and the door mirror 11 in the first embodiment. Therefore, explanations for the structures are omitted here and only the on/off control operation by the lighting device 21 of the lighting device control apparatus will be explained. Additionally, similar to FIG. 6, "OFF" and "ON" of the ignition switch (see (1) in FIG. 7) respectively indicate before and after the starting of the engine, and "OFF" and "ON" of the parking switch (see (2) in FIG. 7) respectively indicate release and activation of the parking brake.

Also similar to FIG. 6, in FIG. 7, the headlight driving signal is a driving signal supplied to the headlight 22 for driving the headlight 22, and "OFF" and "ON" of this signal respectively indicate the light-off state and the light-on state of the headlight 22 (see (3) in FIG. 7). Similarly, the direction indicator driving signal is a driving signal supplied to the direction indicator which includes the high brightness LEDs 5 and 6 so as to drive the direction indicator, and "OFF" of the direction indicator driving signal indicates the light-off state of the direction indicator including the high brightness LEDs 5 and 6, while "ON" of the direction indicator driving signal indicates the light-on state of one or both of the high brightness LEDs 5 and 6 (of the direction indicator) provided at the right and left sides (see (4) in FIG. 7). The sub light source driving signal is a driving signal supplied to the LEDs 1, 2, and 3 so as to drive these LEDs, and "OFF" of this signal indicates the light-off state of the sub light source 16b while "ON" of the signal indicates the light-on state of the sub light source 16b (see (5) in FIG. 7).

As shown in FIG. 7, at time t1, the ignition switch 23 is switched from OFF to ON and the engine is started. When the parking brake is released at time t2 and the parking switch 26 is switched from ON to OFF, the on/off control of the sub light source 16b by the control device 21 is started.

At this time (t2), if the headlight switch 25 and the direction indicator switch 27 are both off and the headlight driving signal and the direction indicator driving signal are also OFF, the control device 21 outputs a pulse-shaped driving signal as the sub light source driving signal to be supplied to the LEDs 1, 2, and 3 so as to perform dynamic driving of the LEDs 1, 2, and 3 so that the sub light source 16b is lit at lower power as a daytime running light in the daytime.

If the headlight switch 25 is turned on while the sub light source 16b is lit at lower power, the control device 21 makes the headlight driving signal (supplied to the headlight 22) ON so as to turn on the headlight 22 (see t3 to t4 in FIG. 7) and also makes the sub light source driving signal (supplied to the LEDs 1, 2, and 3) OFF so as to turn off the sub light source 16b. Instead of such lower power lighting by using a pulse-shaped driving signal in the present embodiment, the LEDs may be driven at constant voltage so as to light the sub light source 16b at normal power as a daytime running light in the daytime.

If the direction indicator switch 27 is turned on while the sub light source 16b is lit at lower power, the control device 21 outputs a driving signal, in which ON and OFF states are alternated at specific regular intervals, as the direction indicator driving signal supplied to the direction indicator which includes the high brightness LEDs 5 and 6 (see t5 to t6 in FIG. 7), so as to make the main light source 16a (i.e., the high brightness LEDs 5 and 6) repeatedly turn on and off. At the same time, the control device 21 also outputs a driving signal in which the ON state and the pulse-shaped signal state are alternated at specific regular intervals and also in synchronism with the direction indicator driving signal. This driving signal is used as the sub light source driving signal supplied to the LEDs 1, 2, and 3.

More specifically, when the direction indicator driving signal is on, an ON signal is also output as the sub light source driving signal, and when the direction indicator driving signal is off, a pulse-shaped driving signal is output as the sub light source driving signal. Accordingly, when the direction indicator including the main light source 16a is on, the sub light source 16b is simultaneously lit at normal power; however, when the direction indicator including the main light source 16a is off, the sub light source 16b is simultaneously lit at lower power. Therefore, the ON signal and the pulsed signal are alternated at specific regular intervals in synchronism with the direction indicator driving signal, so that lower-power lighting and normal power lighting of the sub light source 16b (i.e., the LEDs, 1, 2, and 3) are alternated while keeping the general lower-power in the on state, thereby producing an apparent state in which the sub light source 16b (i.e., the LEDs 1, 2, and 3) is repeatedly turned on and off in synchronism with the main light source 16a (i.e., the high brightness LEDs 5 and 6).

After the headlight switch 25 is turned on at time t7 while the sub light source 16b is off, if the direction indicator switch 27 is turned on (see time t8 to t9), the control device 21 outputs a driving signal in which ON and OFF states are alternated at specific regular intervals as the direction indicator driving signal and also outputs a driving signal, in which ON and OFF states are alternated at specific regular intervals and in synchronism with the direction indicator driving signal, as the sub light source driving signal.

Accordingly, while the headlight 22 is off, the sub light source 16b is used as a daytime running light emitting with lower power in the daytime, which improves the visibility of the vehicle from the surroundings. When the direction indicator switch 27 is turned on and thus the direction indicator is operated, lower power lighting and normal lighting of the sub light source 16b are alternated in synchronism with the main light source 16a, while keeping the general lower power on state. Therefore, visibility of the direction indicator from the surroundings can be improved while keeping sufficient visibility of the vehicle from the surroundings.

Similar to the first embodiment, in the present embodiment, the emitting devices used as the main light source 16a and the sub light source 16b are not limited to LEDs, and any emitting devices which can be driven (i.e., switched on) by a pulsed driving signal can be used. In addition, the daytime running light (DRL) lit in the daytime for improving the visibility of the vehicle is not limited to the sub light source 16b, and another lighting device provided at the vehicle, other than the main light source 16a, may be lit together with the sub light source 16b.

Also in the lighting device control apparatus in the present embodiment, the control device 21 starts the on/off control of the sub light source 16b when the engine is started and the parking brake is released. In this condition, if both the headlight switch 25 and the direction indicator switch 27 are off, that is, both the headlight 22 and the direction indicator are not lit, the control device 21 turns on the sub light source 16b at normal or lower power as a daytime running light in the daytime. If the headlight switch 25 is turned on while the sub light source 16b is lit at normal or lower power, the control device 21 turns off the sub light source 16.

If the direction indicator switch 27 is turned on while the sub light source 16b is lit at normal or lower power, the control device 21 alternates the normal power on state and the lower power on state of the LEDs 1, 2, and 3, so that the sub light source 16b (i.e., the LEDs 1, 2, and 3) is apparently switched on and off in synchronism with the main light source 16a (i.e., the high brightness LEDs 5 and 6). If the direction indicator switch 27 is turned on while the sub light source 16b is off, the control device 21 alternates the ON and OFF states of the LEDs 1, 2, and 3 as performed in the first embodiment, thereby switching on and off the sub light source 16b (i.e., the LEDs 1, 2, and 3) in synchronism with the main light source 16a (i.e., the high brightness LEDs 5 and 6).

Therefore, similar to the first embodiment, the sub light source 16b can be used as a daytime running light (DRL) for improving the visibility of the vehicle in the daytime. Therefore, it is possible to realize a lighting device control apparatus for vehicles or a relevant vehicle, by which visibility of the vehicle in the daytime can be improved and the lighting device can be efficiently used. In addition, another lighting device (i.e., other than the main light source 16a and the sub light source 16b) may be lit in the daytime in synchronism with the sub light source 16b, thereby further improving the visibility of the vehicle in the daytime.

Furthermore, when the main light source 16a as the direction indicator is switched on and off while the sub light source 16b is lit in the daytime, an apparent state can be realized in which the sub light source 16b and the main light source 16a are turned on and off in synchronism with each other as a direction indicator. Therefore, even when the sub light source 16b is lit in the daytime, visibility of the main light source 16a in the repeatedly on/off state is not degraded and thus sufficient visibility can be obtained for both of the vehicle and the direction indicator in the daytime. In particular, while keeping the function as the daytime light source, illuminance of the sub light source 16b is raised to a normal level in synchronism with the main light source 16a while the main light source 16a is on, and illuminance of the sub light source 16b is lowered to the specific lower-power level when the main light source 16a is off, thereby producing an apparent state in which the main light source 16a and the sub light source 16b are simultaneously turned on and off as the direction indicator. Therefore, it is possible to secure both of the visibility of the vehicle and the visibility of the direction indicator in the daytime. In addition, illuminance necessary for a daytime running light (DRL) can be always secured, thereby realizing a lighting device control apparatus for vehicles or a relevant vehicle which can satisfy legal conditions as regulations.

THIRD EMBODIMENT

Another Eembodiment of On/Off Control of Lighting Devices.

Figure 8:
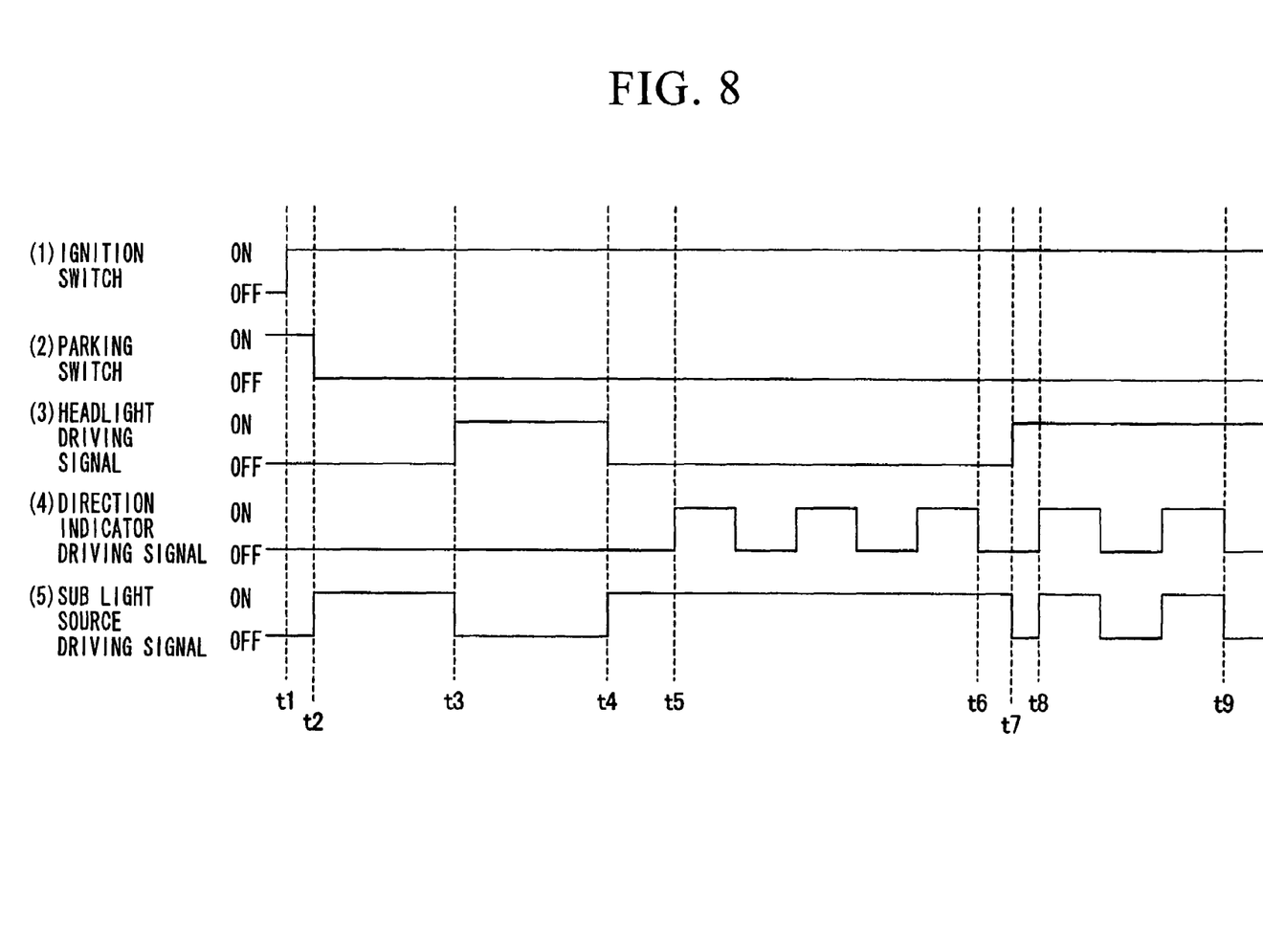
FIG. 8 is a timing chart for signals used in the on/off control for the lighting devices by the lighting device control apparatus as the third embodiment according to the present invention.

Next, another embodiment of the on/off control of the lighting devices will be explained as the third embodiment with reference to the drawings. FIG. 8 is a timing chart of signals for indicating the on/off control of the lighting devices in the present embodiment. In the third embodiment, the structure of the lighting device control apparatus and the structure of each lighting device whose on/off state is to be controlled by the lighting device control apparatus, are identical to those of the lighting device control apparatus and the door mirror 11 in the first embodiment. Therefore, explanations for the structures are omitted here and only the on/off control operation performed by the lighting device 21 of the lighting device control apparatus will be explained. Additionally, similar to FIG. 6, "OFF" and "ON" of the ignition switch (see (1) in FIG. 8) respectively indicate before and after the starting of the engine, and "OFF" and "ON" of the parking switch (see (2) in FIG. 8) respectively indicate release and activation of the parking brake.

Also similar to FIG. 6, in FIG. 8, the headlight driving signal is a driving signal supplied to the headlight 22 for driving the headlight 22, and "OFF" and "ON" of this signal respectively indicate the light-off state and the light-on state of the headlight 22 (see (3) in FIG. 8). Similarly, the direction indicator driving signal is a driving signal supplied to the direction indicator which includes the high brightness LEDs 5 and 6 so as to drive the direction indicator, and "OFF" of the direction indicator driving signal indicates the light-off state of the direction indicator including the high brightness LEDs 5 and 6, while "ON" of the direction indicator driving signal indicates the light-on state of one or both of the high brightness LEDs 5 and 6 (of the direction indicator) provided at the right and left sides (see (4) in FIG. 8). The sub light source driving signal is a driving signal supplied to the LEDs 1, 2, and 3 so as to drive these LEDs, and "OFF" of this signal indicates the light-off state of the sub light source 16b while "ON" of the signal indicates the light-on state of the sub light source 16b (see (5) in FIG. 8).

As shown in FIG. 8, at time t1, the ignition switch 23 is switched from OFF to ON and the engine is started. When the parking brake is released at time t2 and the parking switch 26 is switched from ON to OFF, the on/off control of the sub light source 16b by the control device 21 is started.

At this time (t2), if the headlight switch 25 and the direction indicator switch 27 are both off and the headlight driving signal and the direction indicator driving signal are also OFF, the control device 21 makes the sub light source driving signal (to be supplied to the LEDs 1, 2, and 3) on so as to drive the LEDs 1, 2, and 3 at constant voltage, so that the sub light source 16b is lit as a daytime running light in the daytime. In order to light the sub light source 16b as a daytime running light in the daytime in the present embodiment, the LEDs 1, 2, and 3 may be dynamically driven using a pulsed driving signal in spite of the constant voltage driving as explained above, so as to light the sub light source 16b at lower power.

If the headlight switch 25 is turned on while the sub light source 16b is on, the control device 21 makes the headlight driving signal (supplied to the headlight 22) ON so as to turn on the headlight 22 (see t3 to t4 in FIG. 8) and also makes the sub light source driving signal (supplied to the LEDs 1, 2, and 3) OFF so as to turn off the sub light source 16b.

If the direction indicator switch 27 is turned on while the sub light source 16b is turned on, the control device 21 outputs a driving signal, in which ON and OFF states are alternated at specific regular intervals, as the direction indicator driving signal supplied to the direction indicator which includes the high brightness LEDs 5 and 6 (see t5 to t6 in FIG. 8), so as to make the main light source 16a (i.e., the high brightness LEDs 5 and 6) repeatedly turn on and off. At the same time, the control device 21 outputs a constant voltage signal as the sub light source driving signal supplied to the LEDs 1, 2, and 3, so as to drive the LEDs 1, 2, and 3 at a constant voltage, thereby keeping the on state of the sub light source 16b as a daytime running light in the daytime. In the present embodiment, if the sub light source 16b is on at lower power as the daytime running light from time t2 to t3, the LEDs 1, 2, and 3 are also dynamically driven using a pulsed driving signal from time t5 to t6 so as to light the sub light source 16b at lower power.

Even after the headlight switch 25 is turned on at time t7 and the sub light source 16b is turned off, if the direction indicator switch 27 is turned on (see time t8 to t9), the control device 21 outputs a driving signal in which ON and OFF states are alternated at specific regular intervals as the direction indicator driving signal and also outputs a driving signal, in which ON and OFF states are alternated at specific regular intervals and in synchronism with the direction indicator driving signal, as the sub light source driving signal.

Accordingly, while the headlight 22 is off, the sub light source 16b is used as a daytime running light in the daytime, which improves the visibility of the vehicle from the surroundings. When the headlight 22 is on and the direction indicator switch 27 is turned on and thus the direction indicator is operated, the sub light source 16b is switched on and off as a direction indicator in synchronism with the main light source 16a; thus, it is possible to improve the visibility of the direction indicator of the vehicle from the surroundings in a dark place as in the nighttime.

In the above embodiment, the emitting devices used as the main light source 16a and the sub light source 16b are not limited to LEDs, and any emitting devices which can be driven (i.e., switched on) by a pulsed driving signal can be used. In addition, the daytime running light (DRL) lit in the daytime for improving the visibility of the vehicle is not limited to the sub light source 16b, and another lighting device provided at the vehicle, other than the main light source 16a, may be lit together with the sub light source 16b.

Also in the lighting device control apparatus in the present embodiment, the control device 21 starts the on/off control of the sub light source 16b when the engine is started and the parking brake is released. In this condition, if both the headlight switch 25 and the direction indicator switch 27 are off, that is, both the headlight 22 and the direction indicator are not lit, the control device 21 lights the sub light source 16b at normal or lower power as a daytime running light in the daytime. If the headlight switch 25 is turned on while the sub light source 16b is lit at normal or lower power, the control device 21 turns off the sub light source 16b.

However, in the present embodiment, if the direction indicator switch 27 is turned on while the sub light source 16b is lit at normal or lower power, the control device 21 keeps the on state of the LEDs 1, 2, and 3 (i.e., the on state at normal or lower power), that is, keeps the sub light source 16b (i.e., the LEDs 1, 2, and 3) on. If the direction indicator switch 27 is turned on while the sub light source 16b is off, the control device 21 makes the sub light source 16b (i.e., the LEDs 1, 2, and 3) switch on and off in synchronism with the main light source 16a (i.e., the high brightness LEDs 5 and 6) by alternating the on and off states of the LEDs 1, 2, and 3, as performed in the first embodiment.

Accordingly, similar to the first embodiment, the sub light source 16b can be used as a daytime running light (DRL) for improving the visibility of the vehicle in the daytime. Therefore, it is possible to realize a lighting device control apparatus for vehicles or a relevant vehicle, by which visibility of the vehicle in the daytime can be improved and the lighting device can be efficiently used. In addition, another lighting device (i.e., other than the main light source 16a and the sub light source 16b) may be lit in the daytime in synchronism with the sub light source 16b, thereby further improving the visibility of the vehicle in the daytime.

Furthermore, when the main light source 16a as the direction indicator is switched on and off while the sub light source 16b is lit in the daytime, the sub light source 16b is kept in the daytime on-state; thus, it is unnecessary to consider the relationship between the on/off state of the main light source 16a and the on/off state of the sub light source 16b, thereby simplifying the circuit structure. In addition, illuminance for the daytime on-state is always secured, and thus visibility of the vehicle in the daytime can be further improved. On the other hand, when the headlight 22 is on and the direction indicator switch 27 is also on and thus the direction indicator is operative, the main light source 16a and the sub light source 16b are turned on and off in synchronism with each other, thereby improving the visibility of the vehicle from the surroundings in a dark place in the nighttime or the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A lighting device control apparatus used in a vehicle which includes a headlight for illuminating a running direction of the vehicle; a first lighting device provided at a side of an external mirror of the vehicle; a second lighting device provided at a front side of the external mirror; and a direction indicator operating device, operated by a driver of the vehicle, for indicating the running direction of the vehicle, wherein the direction indicator operating device controls at least the on/off state of the first lighting device and the lighting device control apparatus comprises:

a lighting device control device for producing a daytime on-state of the second lighting device, according to an on state of the headlight and an operational position of an ignition switch of the vehicle; and wherein the lighting device control device is operable to change illuminance of the second lighting device lit in the daytime on-state, according to the on/off state of the first lighting device.

2. A lighting device control apparatus as claimed in claim 1, wherein the lighting device control device produces a daytime on-state of at least one of other lighting devices provided with the vehicle besides the first and second lighting devices, wherein the daytime on-state of the second lighting device and the daytime on-state of at least one of the other lighting devices are simutaneously produced.

3. A lighting device control apparatus as claimed in claim 1, wherein said first lighting devise is visible at a lateral side and a rear side of the vehicle, and said second lighting device is visible at a front side of the vehicle.

4. A lighting device control apparatus as claimed in claim 1, wherein when the second lighting device is in the daytime on-state, the lighting device control device makes the on/off state of the second lighting device in synchronism with the on/off state of the first lighting device.

5. A lighting device control apparatus as claimed in claim 1, wherein when the second lighting device is in the daytime on-state, the lighting device control device raises illuminance of the second lighting device from a specific level in synchronism with the on state of the first lighting device and lowers the illuminance of the second lighting device to the specific level in synchronism with the off state of the first lighting device.

6. A lighting device control apparatus as claimed in claim 1, wherein the lighting device control device keeps specific illuminance of the second lighting device in the daytime on-state, regardless of the on/off state of the first lighting device.

7. A lighting device control apparatus as claimed in claim 1, wherein illuminance of the daytime on-state of the second lighting device is lower than illuminance of the on state of the first lighting device.

8. A lighting device control apparatus as claimed in claim 1, wherein illuminance of the daytime on-state of the second lighting device is lower than illuminance of the on state of the first lighting device.

9. A lighting device control apparatus as claimed in claim 1, wherein said first and second lighting devices extend continuously from each other.

10. A lighting device control apparatus as claimed in claim 9, wherein illuminance of the daytime on-state of the second lighting device is lower than illuminance of the on state of the first lighting device.

11. A control apparatus for a daytime lighting device in a vehicle having a headlight for illuminating a running direction of the vehicle, an ignition switch, a direction indicating lighting device provided at a side of an external mirror of the vehicle; a daytime lighting device provided at a front side of the external mirror; and a manually operable direction indicator device which indicates the running direction of the vehicle by controlling at least the on/off state of the direction indicating lighting device, the control apparatus comprising:
  a control device for producing a daytime on-state of the second lighting device according to an on state of the headlight and an operational position of the ignition switch of the vehicle; and
  wherein the control device is operable to change illuminance of the daytime lighting device lit in the daytime on-state, according to the on/off state of the direction indicating lighting device.

12. A control apparatus as claimed in claim 11, wherein the control device produces a daytime on-state of at least one of other lighting devices provided with the vehicle besides the direction indicating and daytime lighting devices, wherein the daytime on-state of the daytime lighting device and the daytime on-state of at least one of the other lighting devices are simultaneously produced.

13. A control apparatus as claimed in claim 11, wherein when the daytime lighting device is in the daytime on-state, the control device makes the on/off state of the daytime lighting device in synchronism with on/off state of the direction indicating lighting device.

14. A control apparatus as claimed in claim 11, wherein when the daytime lighting device is in the daytime on-state, the control device raises illuminance of the daytime lighting device from a specific level in synchronism with the on state of the direction indicating lighting device and lowers the illuminance of the daytime lighting device to the specific level in synchronism with the off state of the direction indicating device.

15. A control apparatus as claimed in claim 11, wherein the control device keeps specific illuminance of the daytime lighting device in the daytime on-state, regardless of the on/off state of the direction indicating lighting device.

16. A control apparatus as claimed in claim 11, wherein illuminance of the daytime on-state of the daytime lighting device is lower than illuminance of the on state of the direction indicating lighting device.

* * * * *